(12) United States Patent
Segger et al.

(10) Patent No.: US 7,230,969 B2
(45) Date of Patent: Jun. 12, 2007

(54) ELECTRODE JOINT LOCKING SYSTEM

(75) Inventors: Mark Segger, Strongsville, OH (US); James J. Pavlisin, Cleveland, OH (US)

(73) Assignee: UCAR Carbon Company Inc., Parma, OH (US)

( * ) Notice: Subject to any disclaimer, the term of this patent is extended or adjusted under 35 U.S.C. 154(b) by 0 days.

(21) Appl. No.: 10/860,378

(22) Filed: Jun. 3, 2004

(65) Prior Publication Data

US 2005/0271114 A1    Dec. 8, 2005

(51) Int. Cl.
*B23K 11/16* (2006.01)
(52) U.S. Cl. ............................. 373/92; 373/88; 373/91
(58) Field of Classification Search .................. 373/88, 373/90–93, 94–95; 403/DIG. 5, 266, 267, 403/296; 313/332, 354
See application file for complete search history.

(56) References Cited

U.S. PATENT DOCUMENTS

| | | | |
|---|---|---|---|
| 863,674 A | 8/1907 | Tone | |
| 2,510,230 A | 6/1950 | Johnson et al. | |
| 2,527,294 A * | 10/1950 | Bailey | 313/332 |
| 3,048,433 A * | 8/1962 | Doetsch | 373/92 |
| 4,435,816 A * | 3/1984 | Belz et al. | 373/91 |
| 4,594,722 A * | 6/1986 | Boder | 373/91 |
| 4,725,161 A * | 2/1988 | Dagata | 373/92 |

OTHER PUBLICATIONS

International Publication No. WO 02/078945, Oct. 10, 2002, PCT/US02/10125.
"NEMA Standards Publication CG Jan. 2001, Manufactured Graphite /Carbon Electrodes", pp. 1-14 (total number of pages 18 with cover sheets).

* cited by examiner

*Primary Examiner*—Tu Hoang
(74) *Attorney, Agent, or Firm*—Waddey & Patterson; James R. Cartiglia

(57) ABSTRACT

An electrode joint having first and second complementary elements capable of being joined together to form the joint, wherein one of the threaded elements has at least one slot at least partially along its length; and wherein one of the threaded elements includes a source of a flowable adhesive in fluid communication with the slot.

13 Claims, 2 Drawing Sheets

ELECTRODE JOINT LOCKING SYSTEM

BACKGROUND OF THE INVENTION

1. Technical Field

The present invention relates to a locking system for electrode joints. More particularly, the invention concerns a unique system for facilitating the mechanical locking of electrode joints using an adhesive material.

2. Background Art

Graphite electrodes are used in the steel industry to melt the metals and other ingredients used to form steel in electrothermal furnaces. The heat needed to melt metals is generated by passing current through one or a plurality of electrodes, usually three, and forming an arc between the electrodes and the metal. Electrical currents in excess of 100,000 amperes are often used. The resulting high temperature melts the metals and other ingredients. Generally, the electrodes used in steel furnaces are used in electrode columns, that is, a series of individual electrodes joined to form a single column. In this way, as electrodes are depleted during the thermal process, replacement electrodes can be joined to the column to maintain the length of the column extending into the furnace.

Conventionally, electrodes are joined into columns via a pin (sometimes referred to as a nipple) that functions to join the ends of adjoining electrodes. Typically, the pin takes the form of opposed male threaded sections, with at least one end of each of the electrodes comprising female threaded sections capable of mating with a male threaded section of the pin. Thus, when each of the opposing male threaded sections of a pin are threaded into female threaded sections in the ends of two electrodes, those electrodes become joined into an electrode column. Commonly, the joined ends of the adjoining electrodes, and the pin therebetween, are referred to in the art as a joint.

Alternatively, the electrodes can be formed with a male threaded protrusion or tang machined into one end and a female threaded socket machined into the other end, such that the electrodes can be joined by threading the male tang of one electrode into the female socket of a second electrode, and thus form an electrode column. The joined ends of two adjoining electrodes in such an embodiment is referred to in the art as a male-female joint.

Given the extreme thermal and mechanical stress that the electrode and the joint (and indeed the electrode column as a whole) undergo, detachment of the joint and subsequent loss of the electrode column below the detached joint is a recurring problem. In so-called non-jammed joints, where the threads of the pin and electrodes, or the two electrodes in a male-female joint, meet on only one of the thread faces, solutions have been proposed, where pitch or another material is allowed to melt and then infiltrate between the threads, where it carbonizes in the heat of the furnace and forms a bond between the joint elements.

For instance, in International application PCT/US02/10125, inventors Pavlisin and Weber disclose a "plug" formed of pitch and expandable graphite. When the plug is placed at the base of an electrode socket, the heat of the furnace causes the pitch to melt and the graphite to expand, forcing the melted pitch between the threads where it carbonizes and locks the joint together. Another joint locking system employed in the past has been to provide one or more holes in an electrode pin at or near each of its ends, and positioning pitch in the holes. Again, the heat of the furnace causes the pitch to melt and flow across the threads where it carbonizes and locks the joint in position.

Although effective, these prior art methods for joint locking are only maximally effective in non-jammed threads, such as are illustrated in FIG. 1a. In fully jammed threads, illustrated in FIG. 1, where both faces of the threads of one element contact the threads of the other element, there is insufficient space between the threads to permit the pitch or other adherent composition to flow between the threads. There exists a need, therefore, for an improved locking mechanism for fully jammed graphite electrode joints.

SUMMARY OF THE INVENTION

It is an aspect of the present invention to provide a system for locking a joint for graphite electrodes.

It is another aspect of the present invention to provide a joint for graphite electrodes which is designed to better withstand the thermal and mechanical stresses on an electrode column in use, as compared to art-conventional graphite electrode joints.

It is yet a further aspect of the present invention to provide a joint for graphite electrodes which produces electrode column joints having improved strength and stability.

Still another aspect of the present invention is a graphite electrode joint, having improved resistance to stub loss, defined as the loss of the part of the electrode column lying from the arc tip (that is, the end or tip of the electrode column extending into the furnace and from which the arc is formed) to and sometimes including the joint closest to the arc tip, as compared to art-conventional graphite electrode joints.

These aspects and others that will become apparent to the artisan upon review of the following description can be accomplished by providing an electrode joint formed from first and second complementary elements, such as graphite electrodes, capable of being joined together to form the joint, wherein one of the threaded elements has at least one slot (and preferably a plurality of slots) at least partially along its length; and further including a source of a flowable adhesive in fluid communication with the slot. The source of flowable material can further comprise a flow-enhancing material. Preferably, the first and second complementary elements comprise a male threaded element, such as a pin or a male tang, and a female threaded element, such as a female socket, which can be threadedly joined to form the joint.

The flowable adhesive advantageously comprises pitch, and is present as a plug disposed at the base of the female threaded element. Alternatively, one of the first and second complementary elements can have an adhesive-containing shaft formed therein and in fluid communication with the slot.

It is to be understood that both the foregoing general description and the following detailed description provide embodiments of the invention and are intended to provide an overview or framework of understanding of the nature and character of the invention as it is claimed. The accompanying drawings are included to provide a further understanding of the invention and are incorporated in and constitute a part of the specification. The drawings illustrate various embodiments of the invention and together with the description serve to describe the principles and operations of the invention.

DETAILED DESCRIPTION OF THE PREFERRED EMBODIMENT

Figure 1:
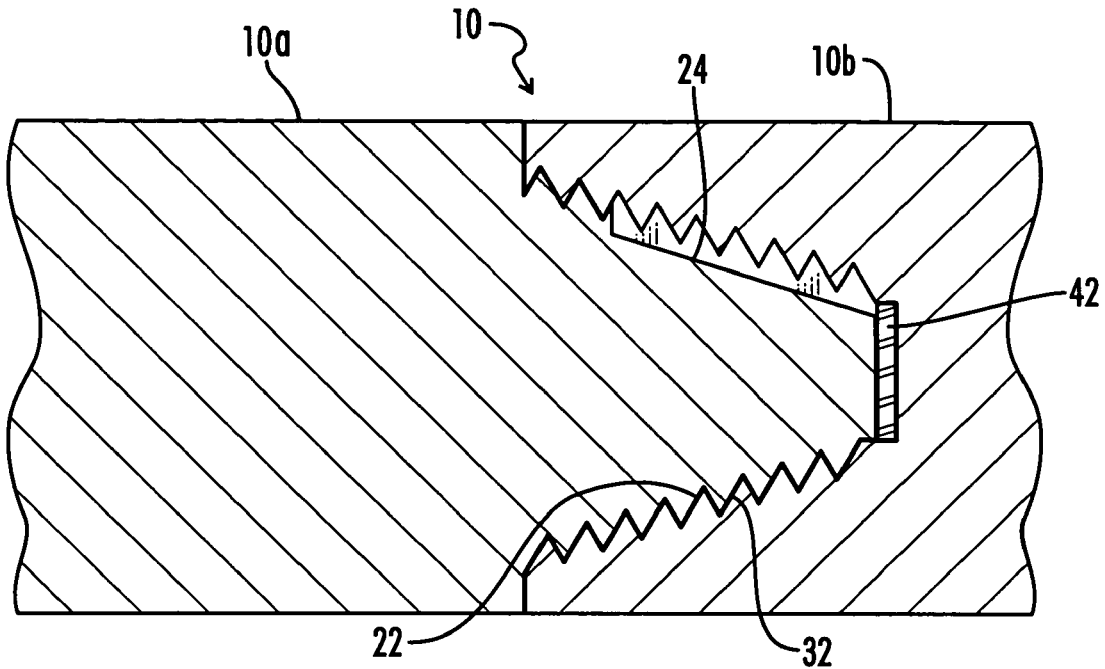
FIG. 1 is a partial side cross-sectional view of a fully jammed male-female graphite electrode joint in accordance with the present invention.
Figure 1A:
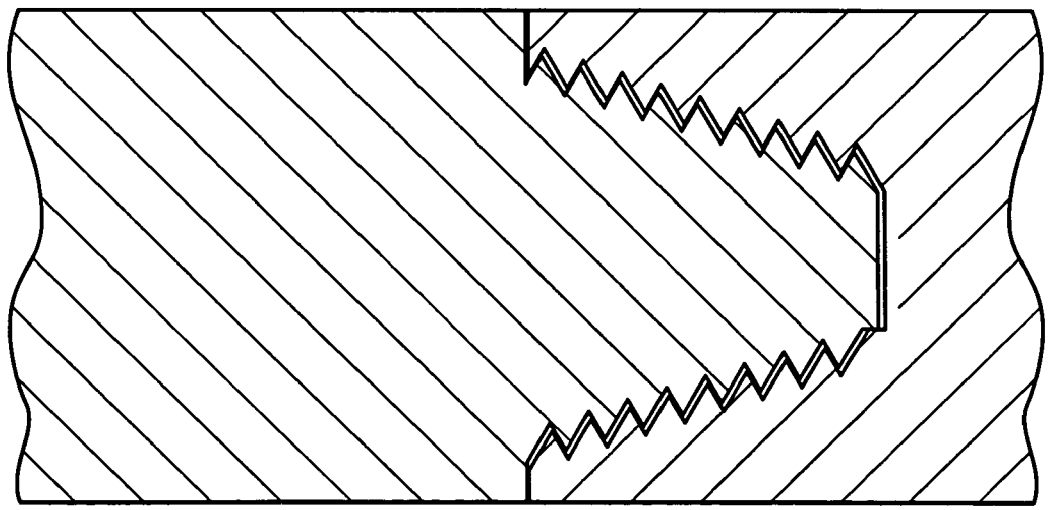
FIG. 1a is a partial side cross-sectional view of a non-jammed graphite electrode joint.

Graphite electrodes can be fabricated by first combining a particulate fraction comprising calcined coke, pitch and, optionally, mesophase pitch or PAN-based carbon fibers into a stock blend. More specifically, crushed, sized and milled calcined petroleum coke is mixed with a coal-tar pitch binder to form the blend. The particle size of the calcined coke is selected according to the end use of the article, and is within the skill in the art. Generally, particles up to about 25 millimeters (mm) in average diameter are employed in the blend. The particulate fraction preferable includes a small particle size filler comprising coke powder. Other additives that may be incorporated into the small particle size filler include iron oxides to inhibit puffing (caused by release of sulfur from its bond with carbon inside the coke particles), coke powder and oils or other lubricants to facilitate extrusion of the blend.

Most preferably, the carbon fibers (when used) are preferably present at a level of about 0.5 to about 6 parts by weight of carbon fibers per 100 parts by weight of calcined coke, or at about 0.4% to about 5.5% by weight of the total mix components (excluding binder). The preferred fibers have an average diameter of about 6 to about 15 microns, and a length of preferably about 4 mm to about 25 mm, and most preferably less than about 32 mm. The carbon fibers used in the inventive process should preferably have a tensile strength of at least about 150,000 psi. Most advantageously, the carbon fibers are added to the stock blend as bundles, each bundle containing from about 2000 to about 20,000 fibers.

Preferably, the fibers are added after mixing of the particulate fraction and pitch has already begun. Indeed, in a more preferred embodiment, the fibers are added after at least about half the mix cycle has been completed, most preferably after at least about three-quarters of the mix cycle has been completed. For instance, if the mixing of the particulate fraction and pitch takes two hours (i.e., a mix cycle is two hours), the fibers should be added after one hour, or even ninety minutes, of mixing. Adding the fibers after the mixing has begun will help preserve fiber length (which can be reduced during the mixing process) and thereby the beneficial effects of the inclusion of fibers, which are believed to be directly related to fiber length.

As noted above, the particulate fraction can include small particle size filler (small is used herein as compared to the particle size of the calcined coke, which generally has a diameter such that a major fraction of it passes through a 25 mm mesh screen but not a 0.25 mm mesh screen, and as compared to the fillers conventionally employed). More specifically, the small particle size filler comprises at least about 75% coke powder, by which is meant coke having a diameter such that at least about 70%, and more advantageously up to about 90%, will pass through a 200 Tyler mesh screen, equivalent to 74 microns.

The small particle size filler can further comprise at least about 0.5% and up to about 25% of other additives like a puffing inhibitor such as iron oxide. Again, the additive should also be employed at a particle size smaller than that conventionally used. For instance, when iron oxide is included, the average diameter of the iron oxide particles should be such that they are smaller than about 10 microns. Another additional additive which can be employed is petroleum coke powder, having an average diameter such that they are smaller than about 10 microns, added to fill porosity of the article and thus enable better control of the amount of pitch binder used. The small particle size filler should comprise at least about 30%, and as high as about 50% or even 65% of the particulate fraction.

After the blend of particulate fraction, pitch binder, etc. is prepared, the body is formed (or shaped) by extrusion though a die or molded in conventional forming molds to form what is referred to as a green stock. The forming, whether through extrusion or molding, is conducted at a temperature close to the softening point of the pitch, usually about 100° C. or higher. The die or mold can form the article in substantially final form and size, although machining of the finished article is usually needed, at the very least to provide structure such as threads. The size of the green stock can vary; for electrodes the diameter can vary between about 220 mm and 750 mm.

After extrusion, the green stock is heat treated by baking at a temperature of between about 700° C. and about 1100° C., more preferably between about 800° C. and about 1000° C., to carbonize the pitch binder to solid pitch coke, to give the article permanency of form, high mechanical strength, good thermal conductivity, and comparatively low electrical resistance, and thus form a carbonized stock. The green stock is baked in the relative absence of air to avoid oxidation. Baking should be carried out at a rate of about 1° C. to about 5° C. rise per hour to the final temperature. After baking, the carbonized stock may be impregnated one or more times with coal tar or petroleum pitch, or other types of pitches or resins known in the industry, to deposit additional coke in any open pores of the stock. Each impregnation is then followed by an additional baking step.

After baking, the carbonized stock is then graphitized. Graphitization is by heat treatment at a final temperature of between about 2500° C. to about 3400° C. for a time sufficient to cause the carbon atoms in the coke and pitch coke binder to transform from a poorly ordered state into the crystalline structure of graphite. Advantageously, graphitization is performed by maintaining the carbonized stock at a temperature of at least about 2700° C., and more advantageously at a temperature of between about 2700° C. and about 3200° C. At these high temperatures, elements other than carbon are volatilized and escape as vapors. The time required for maintenance at the graphitization temperature using the process of the present invention is no more than about 18 hours, indeed, no more than about 12 hours. Preferably, graphitization is for about 1.5 to about 8 hours. Once graphitization is completed, the finished article can be cut to size and then machined or otherwise formed into its final configuration.

When the electrode joint is one utilizing a pin, the pin is formed in a similar manner, although the number of pitch impregnation/bake steps may be higher for a pin in order to provide greater strength. Once formed, the finished article is then machined or otherwise formed into its final configuration for use as a pin.

When a male-female electrode joint is desired, the male tang (and, by extension, the female socket) should advantageously be dimensioned such that the tang will provide the required strength in use. More specifically, the ratio of the length of the male tang to the diameter of the electrode (referred to as the tang diameter factor) of at least about 0.60 is desirably in creating a male-female electrode joint having improved stability and commercially acceptable performance. Moreover, a ratio of a factor defined by the ratio of the diameter of the male tang at its base to the male tang length (referred to as the tang diameter factor) should be no greater than 2.5 times the tang factor for an especially effective joint with a tang factor of about 0.60. Indeed, the tang diameter factor should most preferably vary with the tang factor, such that when a joint with a tang factor higher than 0.60 is produced, the tang diameter factor of the joint should be lower than 2.5 times the stub factor. More specifically, for every 0.01 higher than 0.60 that the tang factor of a joint is, the maximum tang diameter factor should be about 0.016 lower. Another joint characteristic that can come into play in designing an effective male-female joint is referred to herein as the taper factor, which is defined as the ratio of the taper (expressed in degrees) of the male tang to the tang factor, which should be at least about 15, where the tang factor is 0.85, and should also vary as joints with different tang factors are produced. For instance, for every 0.01 lower than 0.85 that the tang factor of a joint is, the minimum taper factor should be about 1.25 higher.

Figure 2:
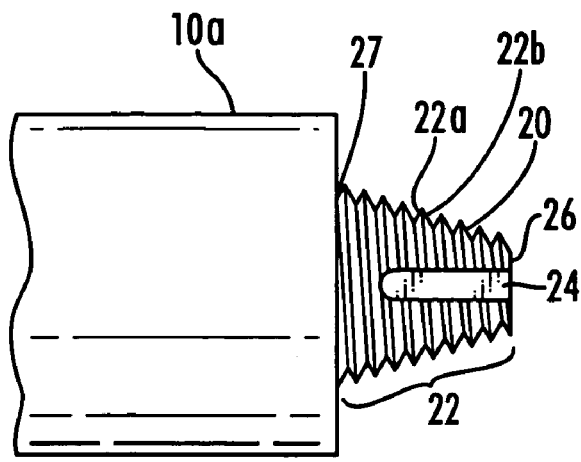
FIG. 2 is a partial side plan view of a graphite electrode having a slotted male tang for the graphite electrode joint of FIG. 1.

As illustrated in FIGS. 1 and 2, the inventive electrode joint comprises a male-female graphite electrode joint 10, having a male tang 20 at the end of one electrode 10a and a female socket 30 at the end of the adjoining electrode 10b, such that the male tang 20 can threadedly engage the female socket 30 to form joint 10. The engagement of male tang 20 and female socket 30 is in a fully jammed fashion, as illustrated in FIG. 1, such that each face 22a and 22b of the threads 22 of male tang 20 abuts a face 32a and 32b of the threads 32 of female socket 30.

Male tang 20 is formed such that at least one slot or groove 24 extends at least partially along its length, as illustrated in FIG. 2. In the preferred embodiment, a plurality of slots 24 extend at least partially along the length of male tang 20; indeed, in the most preferred embodiment, four slots 24 are arrayed along the length of male tang 20, with each slot disposed about the circumference of male tang 20 at approximately 90° intervals.

Figure 5:
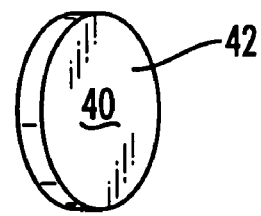
FIG. 5 is a perspective side view of an adhesive material plug in accordance with the present invention.

A source of an adhesive material 40 is disposed in joint 10, in a location contiguous with slot(s) 24. For instance, an adhesive material plug 42, illustrated in FIG. 5, can be placed at the base of joint 10, as shown in FIG. 1, provided slot(s) 24 extend completely to the end 26 of male tang 20, where the end 26 of male tang 20 approaches the base 36 of female socket 30. Adhesive material 40 should be such that, under the conditions to which joint 10 is exposed, adhesive material 20 flows along slot(s) 24 and forms an adhesive bond with the threads 32 of female socket 30, to thereby work to prevent unscrewing of joint 10. Advantageously, slot(s) 24 do not extend all the way to the base 27 of male tang 20, to avoid flow of adhesive material out of joint 10.

Suitable materials useful as adhesive material employed in source 40 include cements and resins having melting temperatures below the temperature to which joint 10 is exposed in the furnace, but higher than the typical storage temperature of electrodes 10a and 10b (to prevent premature melting). The suitable cements or resins should be those which cure or coke at the furnace temperatures, such that, after melting and flowing about threads 32, the material cures or cokes to form the desired bond. Most preferably, the material comprises pitch, which has a melting temperature below the temperature to which joint 10 is exposed in the furnace, but higher than the typical storage temperature of electrodes 10a and 10b; pitch also cokes at the furnace temperatures, such that, after melting and flowing about threads 32, it cokes to bond electrodes 10a and 10b of joint 10 together.

Source 40 can comprise other elements besides the adhesive material itself. For instance, a foaming agent such as oxalic acid, along with metallurgical pitch and carbon fine particles, can be included with the adhesive material, to facilitate flow of the adhesive material along slot(s) 24. Other materials, such as binders, etc. may also be included, if desired.

Figure 6:
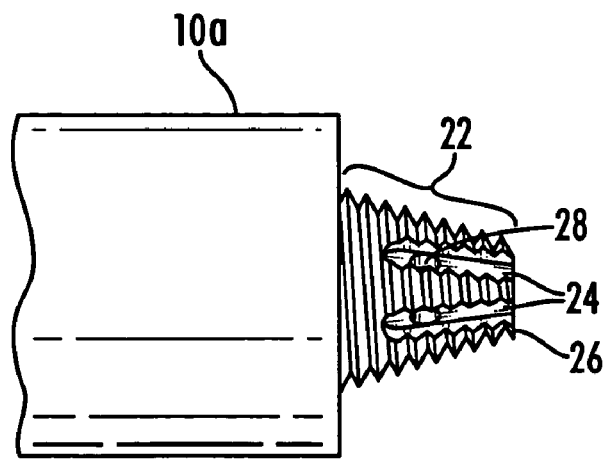
FIG. 6 is a partial side cross-sectional view of a graphite electrode having a slotted male tang with a bore hole, in accordance with the present invention.
Figure 7:
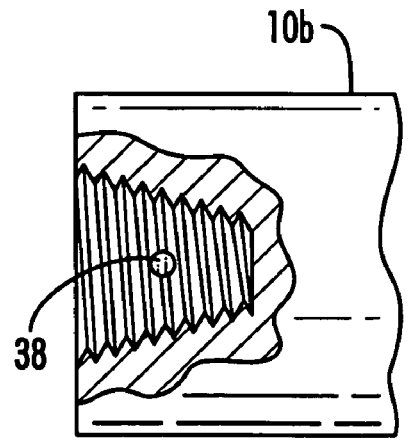
FIG. 7 is a partial side cross-sectional view of a graphite electrode having a female socket with a bore hole, in accordance with the present invention.

Although the source of adhesive material 40 can be provided in the form of a plug 42 disposed at the base of joint 10, other locations for the source of adhesive material 40 can also be contemplated. For instance, as shown in FIG. 6, one or more bore holes 28 can be formed in male tang 20, such that the entrance to each bore hole 28 lies within slot(s) 24; bore hole(s) 28 can have the source of adhesive material 40 therewithin, such that in the furnace the adhesive material flows out of bore hole(s) 28 and along slot(s) 24. Similarly, bore hole(s) 38 can be formed in female socket 30, as shown in FIG. 7, provided the entrance to bore hole(s) 38 open into slot(s) 24 formed in male tang 20.

Figure 3:
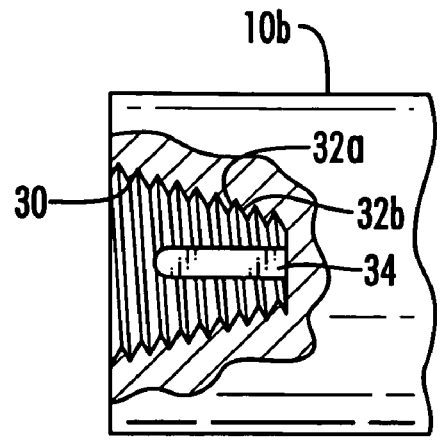
FIG. 3 is a partial side cross-sectional view of a graphite electrode having a slotted female socket for the graphite electrode joint of FIG. 1.
Figure 4:
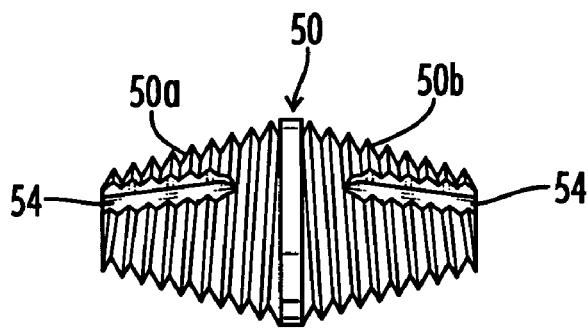
FIG. 4 is a partial side plan view of a slotted pin for a fully jammed graphite electrode joint.

In the same manner that slot(s) 24 can be formed in male tang 20, in a male-female graphite electrode joint, slot(s) 54 can be formed in one or both of the male ends 50a and 50b of a pin 50, illustrated in FIG. 4, for a graphite electrode joint utilizing pin 50 for joinder, with either a plug 42 or adhesive material-filled shaft or bore hole(s) in either pin 50 or female socket 30 employed in the manner described above. Also, as illustrated in FIG. 3, slot(s) 34 can be formed in female socket 30, in either a male-female graphite electrode joint or a pin joint, with either an adhesive material plug 42 or adhesive material-filled bore hole(s) provided in either female socket 30 or male tang 20 (or pin 50, in a pin joint), employed in the manner described above.

Thus, by use of the joint locking system of the present invention, a means of preventing unscrewing of an electrode joint is provided, even in fully jammed joints where prior art systems were ineffective.

The disclosures of all cited patents and publications referred to in this application are incorporated herein by reference.

The above description is intended to enable the person skilled in the art to practice the invention. It is not intended to detail all of the possible variations and modifications that will become apparent to the skilled worker upon reading the description. It is intended, however, that all such modifications and variations be included within the scope of the invention that is defined by the following claims. The claims are intended to cover the indicated elements and steps in any arrangement or sequence that is effective to meet the objectives intended for the invention, unless the context specifically indicates the contrary.

What is claimed is:

1. An electrode joint comprising
   (a) a first element comprising a graphite electrode having a threaded male tang formed therein; and
   (b) a second element comprising a graphite electrode having a threaded socket for receiving the male tang of the first element formed therein,
   wherein the first and second threaded elements are joined together to form the joint with the threads fully jammed, and further wherein either the male tang of the first element or the socket of the second element comprises at least one slot which extends partially along its threads with a slot length less than a length of the first element or a length of the second element and wherein either the male tang of the first element or the socket of the second element comprises a source of a flowable adhesive in fluid communication with the slot.

2. The joint of claim 1 wherein the flowable adhesive comprises pitch.

3. The joint of claim 1 wherein the socket has a base, and the flowable adhesive is present as a plug disposed at the base of the female threaded element.

4. The joint of claim 2 wherein either the male tang or the socket comprises an adhesive-containing shaft formed therein and in fluid communication with the slot.

5. The joint of claim 1 wherein the source of flowable adhesive further comprises a flow-enhancing material.

6. The joint of claim 1 wherein either the male tang or the socket comprise a plurality of slots which extend partially along its length.

7. A graphite electrode comprising a graphite body having a threaded male tang formed therein, the threaded male tang comprising at least one slot which extends partially along its threads with a slot length less than a length of the threaded male tang.

8. The graphite electrode of claim 7 further comprising a source of a flowable adhesive in fluid communication with the slot.

9. The graphite electrode of claim 8 wherein the flowable adhesive comprises pitch.

10. The graphite electrode of claim 8 further comprising an adhesive-containing shaft formed therein and in fluid communication with the slot.

11. The graphite electrode of claim 8 wherein the source of flowable adhesive further comprises a flow-enhancing material.

12. The graphite electrode of claim 7 wherein the threaded element comprises a male tang having at least one slot which extends partially along its threads.

13. The graphite electrode of claim 7 wherein the threaded element comprises a plurality of slots which extend partially along its threads.

* * * * *